(12) United States Patent
Cangemi et al.

(10) Patent No.: US 9,958,579 B2
(45) Date of Patent: May 1, 2018

(54) UV PROTECTIVE COATING FOR LENS ASSEMBLIES HAVING PROTECTIVE LAYER BETWEEN LIGHT ABSORBER AND ADHESIVE

(71) Applicant: CORNING INCORPORATED, Corning, NY (US)

(72) Inventors: Michael Jerome Cangemi, Canandaigua, NY (US); Robert Dennis Grejda, Fairport, NY (US); Keith Ernest Hanford, Macedon, NY (US); Jean-Francois Oudard, Painted Post, NY (US)

(73) Assignee: Corning Incorporated, Corning, NY (US)

(*) Notice: Subject to any disclaimer, the term of this patent is extended or adjusted under 35 U.S.C. 154(b) by 253 days.

(21) Appl. No.: 14/020,102

(22) Filed: Sep. 6, 2013

(65) Prior Publication Data

US 2015/0070906 A1  Mar. 12, 2015

(51) Int. Cl.
| | |
|---|---|
| *G02B 1/10* | (2015.01) |
| *B32B 37/26* | (2006.01) |
| *B32B 37/14* | (2006.01) |
| *F21V 5/04* | (2006.01) |
| *G02B 1/11* | (2015.01) |
| *G02B 1/14* | (2015.01) |
| *G02B 7/02* | (2006.01) |
| *G02B 5/22* | (2006.01) |
| *G02B 5/20* | (2006.01) |

(52) U.S. Cl.
CPC .............. *G02B 1/14* (2015.01); *B32B 37/14* (2013.01); *B32B 37/26* (2013.01); *F21V 5/04* (2013.01); *G02B 1/105* (2013.01); *G02B 1/11* (2013.01); *G02B 5/22* (2013.01); *G02B 7/025* (2013.01); *G02B 5/208* (2013.01); *Y10T 156/10* (2015.01)

(58) Field of Classification Search
CPC ... B32B 17/10678; B32B 37/14; B32B 37/26; F21V 5/04; F21V 9/06; G02B 13/14; G02B 2006/12126; G02B 1/105; G02B 1/11; G02B 5/003; G02B 5/208; G02B 5/22; G02B 7/025
USPC ....... 156/60, 308.6; 359/350, 355, 360, 361, 359/614, 885, 892; 362/293, 326
See application file for complete search history.

(56) References Cited

U.S. PATENT DOCUMENTS 5,844,225 A * 12/1998 Kimock .................. B32B 17/06
  235/462.01
5,991,072 A    11/1999 Solyntjes et al.
(Continued)

*Primary Examiner* — Stephone B Allen
*Assistant Examiner* — Ryan S Dunning
(74) *Attorney, Agent, or Firm* — Kevin L. Bray

(57) ABSTRACT

A lens assembly including a lens; a light absorber that does not transmit light with wavelengths from greater than or equal to about 250 nm to less than or equal to about 400 nm; a lens holder; and an adhesive configure to adhere the lens to the lens holder. The light absorber is positioned such that light having a wavelength from greater than or equal to about 190 nm to less than or equal to about 500 nm is not incident to the adhesive. A method including applying a light absorber, which does not transmit light with wavelengths from greater than or equal to about 190 nm to less than or equal to about 500 nm, to a lens; and configuring the light absorber and the adhesive so that the absorbed light is not incident to the adhesive.

16 Claims, 7 Drawing Sheets

(56) References Cited

U.S. PATENT DOCUMENTS

| | | | |
|---|---|---|---|
| 6,097,536 | A | 8/2000 | Bauer et al. |
| 7,081,278 | B2 | 7/2006 | Lipson et al. |
| 7,232,595 | B2 | 6/2007 | Coykendall et al. |
| 7,256,221 | B2 | 8/2007 | Coykendall et al. |
| 2004/0058061 | A1 | 3/2004 | Lipson et al. |
| 2006/0033984 | A1 | 2/2006 | Bruynooghe et al. |
| 2006/0240365 | A1 | 10/2006 | Lipson et al. |
| 2009/0233233 | A1 | 9/2009 | Six et al. |
| 2009/0310356 | A1* | 12/2009 | Laporte .............. F21V 5/007 362/239 |
| 2011/0044150 | A1* | 2/2011 | Tojo .............. G02B 27/0037 369/100 |
| 2012/0120308 | A1* | 5/2012 | Gutierrez .............. G03B 3/10 348/374 |
| 2013/0196255 | A1* | 8/2013 | Hayashi .............. G03F 1/24 430/5 |

\* cited by examiner

UV PROTECTIVE COATING FOR LENS ASSEMBLIES HAVING PROTECTIVE LAYER BETWEEN LIGHT ABSORBER AND ADHESIVE

TECHNICAL FIELD

The present specification generally relates to protective coatings for lenses, and methods for adhering a lens to an optical system.

BACKGROUND

Lens systems are used in a variety of end-user applications, including in lithography and semiconductor inspection equipment. In these applications, light from a light source is introduced to the system to perform an operation. However, in some applications, UV light introduced to the lens elements may degrade an adhesive that is positioned to couple the lens element to a lens holder. Degradation of the adhesive may lead to misalignment of the lens element.

Accordingly, UV protective coatings for the optical systems may be desired.

SUMMARY

According to one embodiment, an optical assembly is described including a lens; a light absorber that does not transmit light with wavelengths from greater than or equal to about 250 nm to less than or equal to about 400 nm; a lens holder; and an adhesive configure to adhere the lens to the lens holder. The light absorber is positioned such that light having a wavelength from greater than or equal to about 190 nm to less than or equal to about 500 nm is not incident to the adhesive.

In another embodiment, an optical assembly is described including a lens; a light absorber that does not transmit light with wavelengths from greater than or equal to about 190 nm to less than or equal to about 500 nm; and a protective layer positioned on the light absorber.

In yet another embodiment, a method for reducing degradation of an adhesive in an optical assembly is described, including applying a light absorber to a lens, wherein the light absorber does not transmit light with wavelengths from greater than or equal to about 190 nm to less than or equal to about 500 nm; configuring the light absorber and the adhesive so that light with wavelengths from greater than or equal to about 190 nm to less than or equal to about 500 nm is not incident to the adhesive.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Reference will now be made in detail to embodiments of lens assemblies having lenses and lens holders and methods for adhering lenses to lens assemblies. Embodiments of optical systems incorporating a lens assembly may comprise a lens and a lens holder. The lens may be secured to the lens holder by an adhesive. The adhesive may be arranged in a number of configurations at positions where the lens is configured to contact the lens holder. In embodiments, the lens assembly including the lens and the lens holder may be incorporated into an optical system that includes a light source to provide light to the lens. The light source may have a wavelength that is capable of degrading the adhesive upon exposure of the adhesive to the light source. Therefore, in embodiments, the lens assembly comprises an absorber that is positioned to prevent exposure of the adhesive to degrading light.

Figure 1:
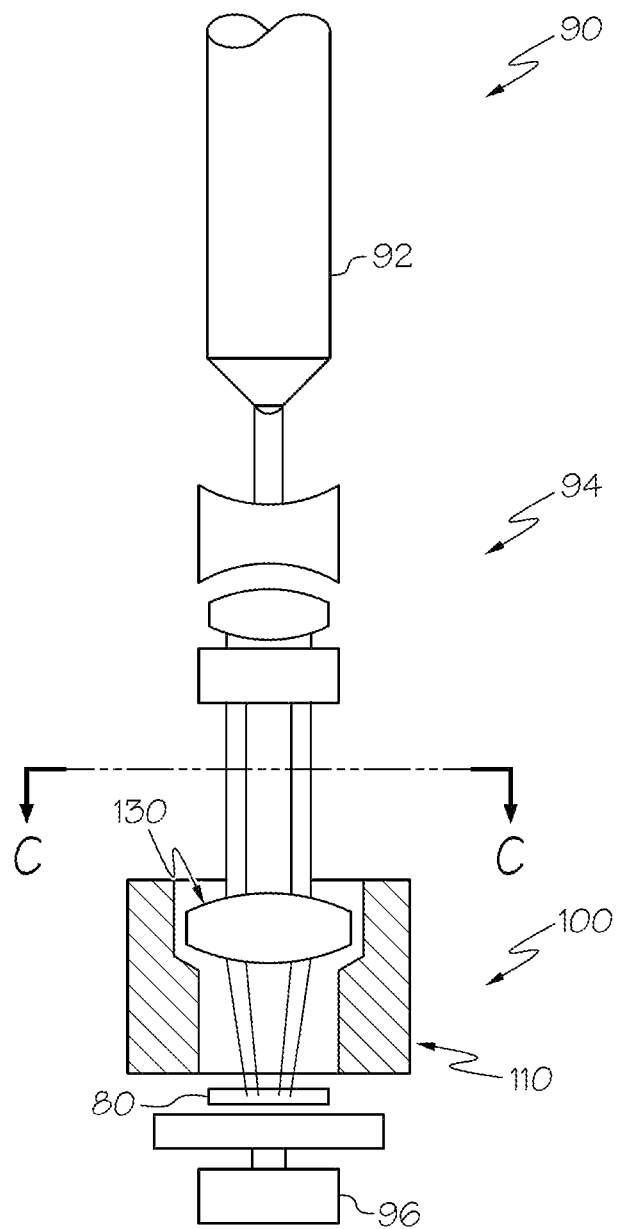
FIG. 1 schematically depicts a cut-away front view of an optical system having a lens coupled to a lens holder according to one or more embodiments shown or described herein.

Referring to FIG. 1, a portion of an optical system 90 is schematically depicted with certain components cut-away for clarity. In the depicted embodiment, the optical system 90 includes a light source 92, at least one beam shaping element 94, a lens assembly 100, and a part carrier 96. The lens assembly 100 includes a lens holder 110 and a lens 130. Light provided by the light source 92 is directed through the lens 130 of the lens assembly 100, which transmits and refracts the light towards a workpiece 80 that is supported on the part carrier 96. The optical system 90 may be used to perform a manufacturing operation on the workpiece 80, for example, inspecting the workpiece 80 or modifying the workpiece 80, for example in a lithography process.

Figure 2:
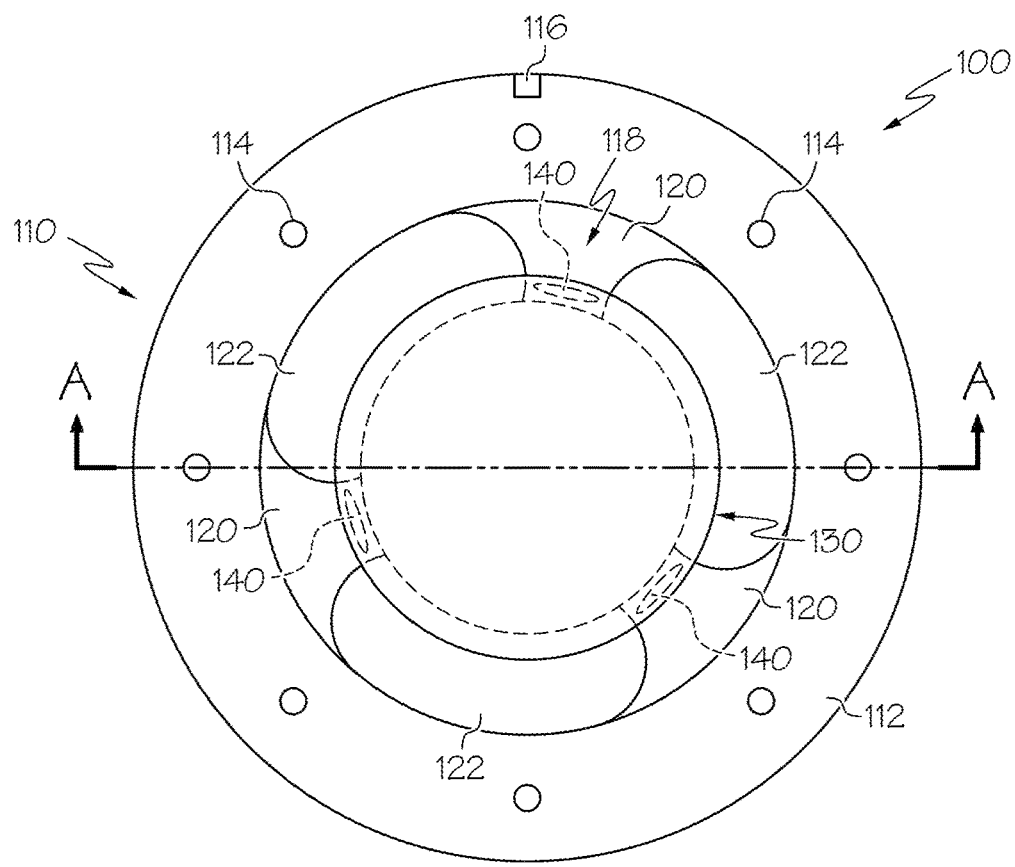
FIG. 2 schematically depicts a top view of a lens assembly having a lens coupled to a lens holder according to one or more embodiments shown or described herein.

Referring now to FIG. 2, one embodiment of the lens assembly 100 is depicted. In this embodiment, the lens assembly 100 includes a lens holder 110 and a lens 130. The lens holder 110, shown in cross-section in FIG. 3, includes a fastening portion 112 and a lens support portion 118. The fastening portion 112 includes a plurality of mounting elements 114 that provide securement locations to couple the lens holder 110 in the optical system and/or to other lens holders within the optical system. In the embodiment shown in FIG. 2, through holes pass through the fastening portion 112. The fastening portion 112 may also include a clocking element 116, for example, a key and/or keyway. The clocking element 116 may provide an orientation reference between adjacent components of the optical system 90 so that alignment of the components of the optical system 90 can be maintained.

In the depicted embodiment, the lens support portion 118 extends in a radially inward orientation from the fastening portion 112. The lens support portion 118 may include a planar portion 124 and a contoured portion 126, as depicted in detail in FIG. 4. In this embodiment, the contoured portion 126 is located at radially inward positions from the planar portion 124. The contoured portion 126 may be shaped to conform to the general shape of the lens 130 at positions at which the lens 130 is coupled to the lens support portion 118 by the adhesive 140.

Figure 4:
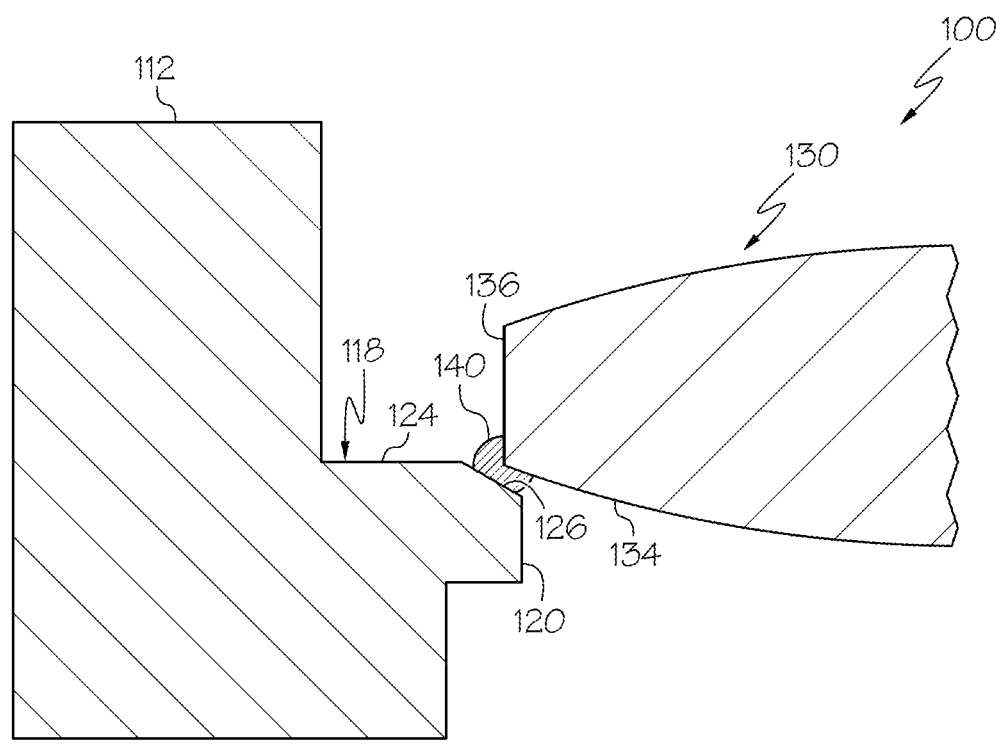
FIG. 4 schematically depicts a detailed sectional front view of a lens assembly having a lens coupled to a lens holder shown at view J of FIG. 3 according to one or more embodiments shown or described herein.

Referring to FIG. 4, an attachment portion 134 of the lens 130 is coupled to the lens support portion 118 with an adhesive 140. In some embodiments, the adhesive 140 is positioned at a plurality of positions arranged in a circumferential orientation around the lens 130. Regions of the adhesive 140 may be separated from one another at intermediate circumferential positions between the regions of the adhesive 140, so that the lens assembly 100 is generally free of adhesive 140 at circumferential positions between the regions of the adhesive 140.

Suitable materials for the adhesive 140 include materials that are commercially available, including cements and adhesives, examples of which are discussed in U.S. Pat. Nos. 7,232,595 and 7,256,221, which are hereby incorporated by reference in their entirety. When assembling the lens assembly 100, the adhesive 140 may be positioned in the desired locations along the lens support portion 118 of the lens holder 110. The lens 130 may be inserted and held in position relative to datum features of the lens holder 110, including the clocking element 116. The lens 130 may be held in position until the adhesive 140 has an opportunity to dry or cure, thereby maintaining the position of the lens 130 relative to the datum features of the lens holder 110. These adhesive materials typically satisfy operational requirements of elastic modulus and coefficient of thermal expansion, and are well suited for use in optical systems 90 described herein.

However, the materials used as the adhesive 140 may be prone to degradation when illuminated by light sources with particular wavelengths. The degradation may be particularly acute when the light source emits light at short wavelengths, for example at wavelengths corresponding to deep ultra-violet and extreme ultra-violet wavelengths. At short wavelengths, energy from the light source has a tendency to break down the materials of the adhesive 140. The degradation may cause outgassing of the adhesive 140, which may lead to contamination of the optical system 90. Degradation of the adhesive 140 may also negatively affect the tensile strength and/or the elasticity of the adhesive 140, which may reduce the ability of the adhesive 140 to maintain the position of the lens 130 relative to the datum features of the lens holder 110. Misalignment between the lens 130 and the datum features of the lens holder 110 may reduce the performance characteristics of the optical system 90.

Figure 3:
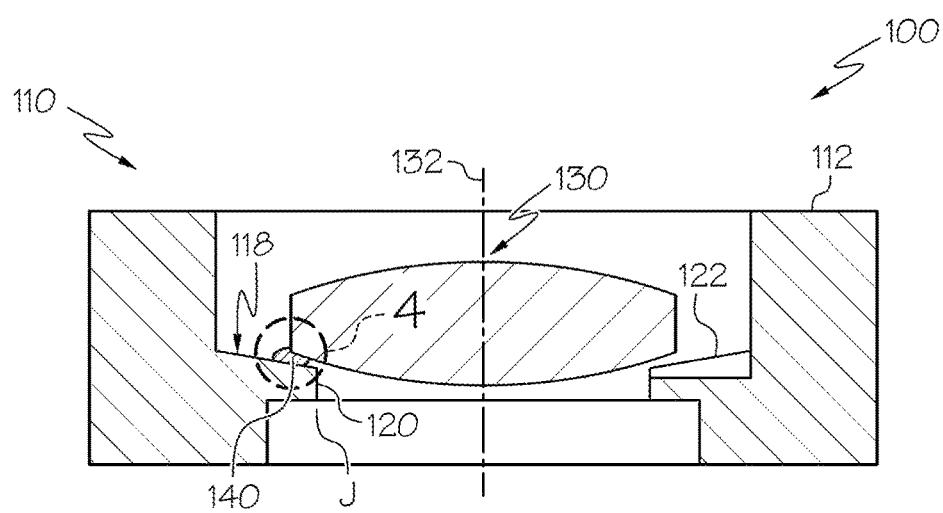
FIG. 3 schematically depicts a sectional front view of a lens assembly having a lens coupled to a lens holder shown along line A-A of FIG. 2 according to one or more embodiments shown or described herein.

In the embodiment depicted in FIGS. 2 and 3, the lens support portion 118 includes a plurality of support pads 120 that are arranged at circumferential orientations around the lens support portion 118. The plurality of support pads 120 are each separated from one another by relief channels 122 that are spaced apart from the support pads 120 in a direction corresponding to an optical axis 132 of the lens 130. The support pads 120 and the relief channels 122 provide an interrupted mounting plane along the lens support portion 118 to which the lens 130 is coupled. In this embodiment, adhesive 140 is positioned along the support pads 120 to contact the lens 130. The adhesive 140 is generally not positioned at positions proximate to the relief channels 122, such that the lens 130 is separated from the lens holder 110 at positions proximate to the relief channels 122. The spacing between the lens 130 and the relief channels 122 of the lens holder 110 provides a gap through which fluid may travel. In certain embodiments of the optical system 90, purge gas may be introduced to the lens assembly 100 and flow through the gap created between the relief channels 122 and the lens 130 to flush any contaminants.

While the embodiment of FIGS. 2 and 3 depicts a lens holder 110 that incorporates three support pads 120, and therefore three relief channels 122 and three regions of adhesive 140, it should be understood that the lens holder 110 may include any number of support pads 120, relief channels 122, and regions of adhesive 140 as dictated by the design and requirements of the optical system 90.

Figure 5:
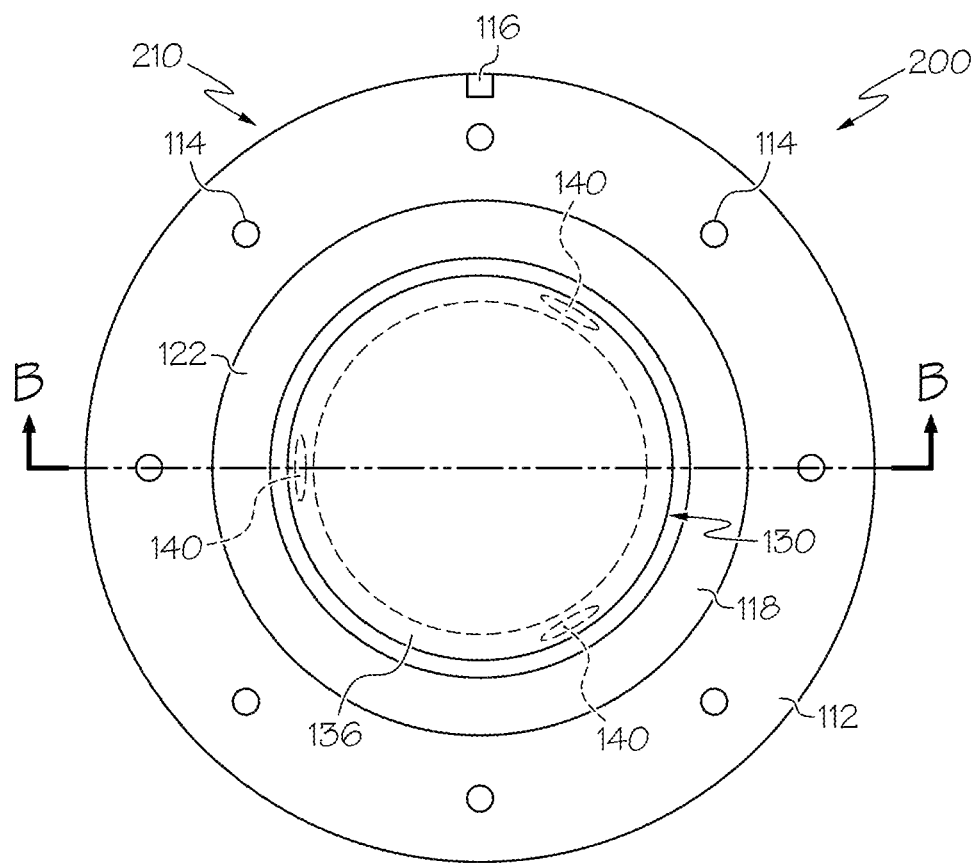
FIG. 5 schematically depicts a top view of a lens assembly having a lens coupled to a lens holder according to one or more embodiments shown or described herein.
Figure 6:
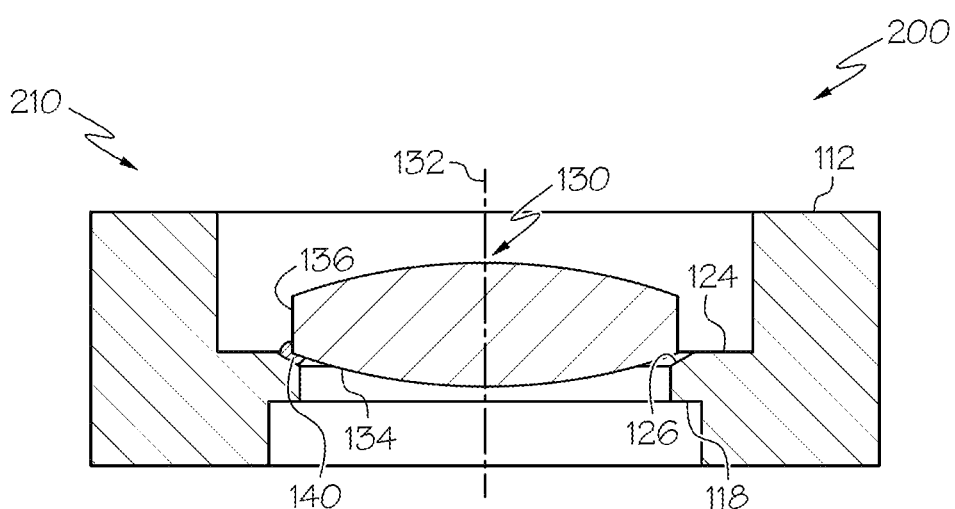
FIG. 6 schematically depicts a sectional front view of a lens assembly having a lens coupled to a lens holder shown along line B-B of FIG. 5 according to one or more embodiments shown or described herein.

Referring now to FIGS. 5 and 6, another embodiment of the lens assembly 200 incorporating a lens holder 210 and the lens 130 is depicted. In this embodiment, the lens holder 210 includes a fastening portion 112 and a lens support portion 118. The fastening portion 112 includes a plurality of mounting elements 114, here through holes that pass through the fastening portion 112, that provide securement locations to couple the lens holder 210 in the optical system. The fastening portion 112 may also include a clocking element 116, for example, a key and/or keyway. The clocking element 116 may provide an orientation reference between adjacent components of the optical system 90 so that radial alignment of the components of the optical system 90 can be maintained.

In this embodiment, the lens support portion 118 may be continuous in shape around its circumference 136, such that the lens support portion 118 is uninterrupted in the circumferential orientation. The lens 130 is coupled to the lens support portion 118 with adhesive 140 positioned in discrete regions that are arranged at positions proximate to the circumference 136 of the lens 130. The adhesive 140 may generally be positioned within the discrete regions only, so that the adhesive 140 is not located at positions between adjacent regions.

Because the adhesive 140 is positioned in discrete regions between the lens support portion 118 of the lens holder 110 and the lens 130, and because the adhesive 140 may have a thickness, the lens 130 may be positioned above the lens support portion 118 by the adhesive 140. In these embodiments, at positions between the discrete regions of adhesive 140, the spacing between the lens support portion 118 and the lens 130 may provide a gap through which fluid may travel. In certain embodiments of the optical system 90, purge gas may be introduced to the lens assembly 200 and flow through the gap created between the lens support portion 118 and the lens 130 at positions spaced apart from the discrete regions of adhesive 140 to flush any contaminants.

Although embodiments discussed above with reference to FIGS. 2-6 recite that the adhesive may be located in discrete regions, in other embodiments the adhesive may be applied to the lens in any configuration suitable to adhere the lens to the lens holder. For example, in some embodiments, the adhesive may be applied continuously around the circumference of the lens.

Figure 7:
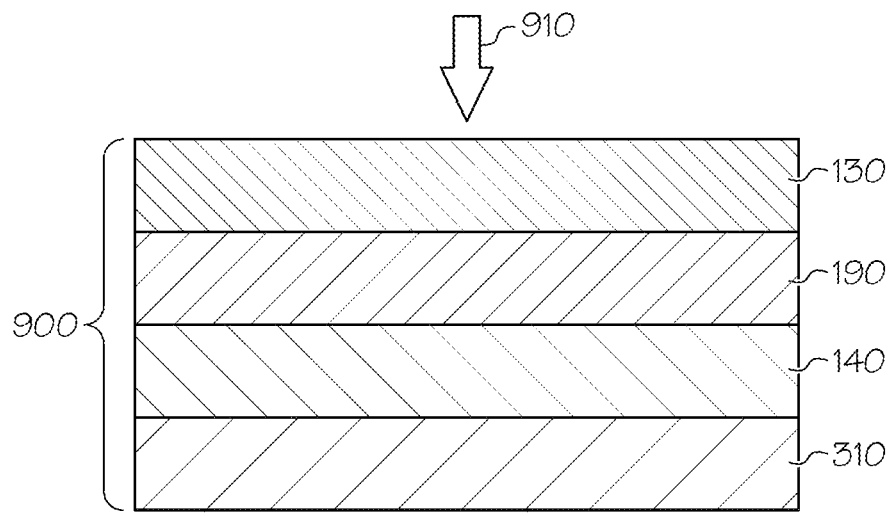
FIG. 7 schematically depicts a layered structure for adhering a lens to a lens holder according to one or more embodiments shown or described herein.

Referring now to the embodiment depicted in FIG. 7, the lens assembly may include a layered structure 900 comprising a light absorber 190 positioned between the lens 130 and the adhesive 140. The light absorber 190 is configured to absorb and/or reflect wavelengths of light emitted from the light source 910 that may degrade the adhesive 140 and thereby cause the position of the lens 130 to shift relative to the lens holder 310. In embodiments, the light absorber 190 may be positioned between the light source 900 and the adhesive 140, as shown, for example, in FIG. 7 thereby preventing light within the absorbed and/or reflected wavelengths from being incident to the adhesive 140. Although FIG. 7 shows a horizontal orientation of the layered structure 900, it should be understood that other orientations of the layered structure, such as a vertical orientation, are within the scope of this disclosure.

The light absorber 190 may comprise any material that absorbs a broad spectrum of UV light. In embodiments, the light absorber 190 comprises a material that absorbs both the actinic wavelength and the dominant curing wavelength. In some embodiments, the light absorber 190 absorbs light with wavelengths of from greater than or equal to about 190 nm to less than or equal to about 500 nm, such as from greater than or equal to about 220 nm to less than or equal to about 480 nm. In other embodiments, the light absorber 190 absorbs light with wavelengths of from greater than or equal to about 230 nm to less than or equal to about 460 nm, such as from greater than or equal to about 240 nm to less than or equal to about 440 nm. In yet other embodiments, the light absorber 190 absorbs light with wavelengths of from greater than or equal to about 250 nm to less than or equal to about 400 nm, such as from greater than or equal to about 260 nm to less than or equal to about 375 nm. In still other embodiments, the light absorber 190 may absorb light with wavelengths of from greater than or equal to about 265 nm to less than or equal to about 365 nm.

The material comprising the light absorber 190 is capable of absorbing and/or reflecting at least a portion of UV light, as described above. In some embodiments, the material comprising the light absorber 190 may be one or more metals that are capable of absorbing and/or reflecting UV light. In other embodiments, the material comprising the light absorber 190 may be one or more transition metals. In yet other embodiments, the material comprising the light absorber 190 may be selected from chromium, titanium, zinc, nickel, manganese, iron, niobium, silver, gold, hafnium, aluminum, tantalum, and mixtures thereof. In embodiments, the metals may be present as substantially pure metals, or as metal oxide, metal nitrides, metal carbides, or mixtures thereof. The variety of materials that may be used as the light absorber allow for different configurations of the layered structure that were not previously available. For example, in some embodiments, the light absorber material may be selected so that the light absorber may be applied to a surface of the lens 130 that does not face the light source. However, in other embodiments, the light absorber material may be selected so that the light absorber may be applied to a surface of the lens 130 that faces the light source.

Although FIG. 7 shows the layers of the layered structure 900 having the same approximate thicknesses, in embodiments, each layer of the layered structure 900 may have any suitable thickness. The light absorber 190 may have a thickness such that the transmission of light at the actinic wavelength is less than or equal to about 5%, or even less than or equal to about 4%. In some embodiments, the thickness of the light absorber is such that the transmission of light at the actinic wavelength is less than or equal to about 3%, or even less than or equal to about 2%. In addition, the light absorber does not transmit light at a wavelength that will cure the adhesive. Therefore, in embodiments, the thickness of the light absorber does not need to be adjusted to transmit light at the curing wavelength. Accordingly, configurations of the light assembly that were previously undesirable because the thickness of the light absorber would not have been tuned to transmit light at a curing wavelength may be employed in some embodiments.

In some embodiments, the layered structure 900 may be configured to provide other properties to the lens apparatus. In embodiments, the layered structure 900 may be configured to reduce the reflection of light from the light absorber 190, the adhesive 140, and/or the lens holder 310 from scattering into various components of the optical apparatus, which may cause the optical apparatus to operate poorly. The anti-reflective properties may be provided by selecting a light absorber 190 that reflects little or no light. However, in some embodiments, the anti-reflective properties may be provided by adding a layer to the layered structure 900. In some embodiments, layers may be added to the layered structure 900 to promote adhesion of one layer to another and/or to protect a layer of the layered structure 900

Figure 8:
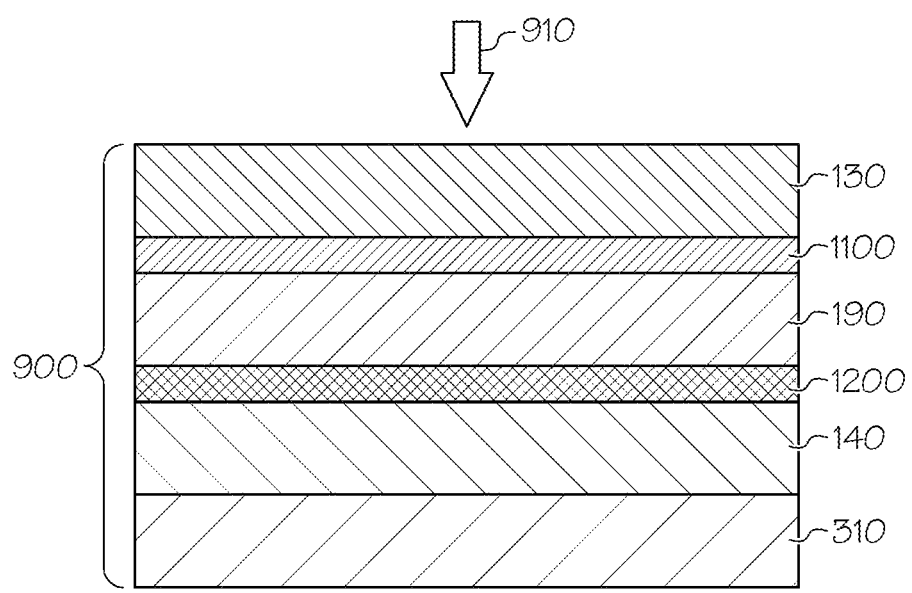
FIG. 8 schematically depicts a layered structure for adhering a lens to a lens holder including an anti-reflective layer and a protective layer according to one or more embodiments shown or described herein.

Referring now to embodiments depicted in FIG. 8, the layered structure 900 may comprise layers in addition to the lens 130, the light absorber 190, the adhesive 140, and the lens holder 310. In some embodiments, the layered structure 900 may comprise one or more of an adhesion promoter/anti-reflective layer 1100 and a protective layer 1200. An adhesion promoter/anti-reflective layer 1100 may be positioned between the lens 130 and the light absorber 190. The adhesion promoter/anti-reflective layer 1100 may comprise a material that promotes adhesion of the light absorber 190 to the lens 130 and also acts as an internal anti-reflective layer. The material comprising the adhesion promoter/anti-reflective layer 1100 may be any material that promotes adhesion of the lens 130 to the light absorber 190 and/or provides anti-reflective properties to the layered structure 900. In some embodiments, the adhesion promoter/anti-reflective layer 1100 may be comprised of metal oxides, metal carbides, metal nitrides, or mixtures thereof. In some embodiments, the adhesion promoter/anti-reflective layer 1100 may be comprised of an oxide of chromium, titanium, zinc, nickel, manganese, iron, niobium, silver, gold, hafnium, aluminum, tantalum, and mixtures thereof. In some embodiments, the adhesion promoter/anti-reflective layer 1100 may be comprised of an oxide of the metal that comprises the light absorber 190. For example, if the light absorber 190 is comprised of chromium, the adhesion promoter/anti-reflective layer 1100 may be comprised of chromium oxide, such as chromium (III) oxide. However, in other embodiments, the adhesion promoter/anti-reflective layer 1100 may be comprised of a metal oxide with a metal that is different from the metal of the light absorber 190. In some embodiments, the layered structure with the adhesion promoter/anti-reflective layer 1100 may have a reflectance of less than or equal to about 20%, such as less than or equal to about 18%, or even less than or equal to about 16%.

The layered structure 900 may also include a protective layer 1200. In embodiments, the protective layer may be applied between the light absorber 190 and the adhesive 140. The protective layer 1200 prevents the light absorber 190 from being damaged during processing. For example, if the light absorber 190 is scratched, light from the light source 910 may be transmitted through the scratch in the light absorber 190 to the adhesive 140, which may cause the adhesive 140 to degrade and allow the lens 130 to become misaligned. By providing a protective layer 1200, it becomes less likely that the light absorber 190 will be damaged, such as by scratching. The protective layer 1200 may be comprised of any material that is capable of providing protection to the light absorber 190 and is also compatible with the light absorber 190 and the adhesive 140. In some embodiments, the protective layer 1200 may be comprised of a metal oxide, metal nitride, metal carbide, or mixtures thereof. In some embodiments, the protective layer 1200 may be comprised of an oxide of chromium, titanium, zinc, nickel, manganese, iron, niobium, silver, gold, hafnium, aluminum, tantalum, and mixtures thereof. In some embodiments, the protective layer 1200 may be comprised of an oxide of the metal that comprises the light absorber 190. For example, if the light absorber 190 is comprised of chromium, the protective layer 1200 may be comprised of chromium oxide, such as chromium (III) oxide. However, in other embodiments, the protective layer 1200 may be comprised of a metal oxide with a metal that is different from the metal of the light absorber 190.

Figure 9:
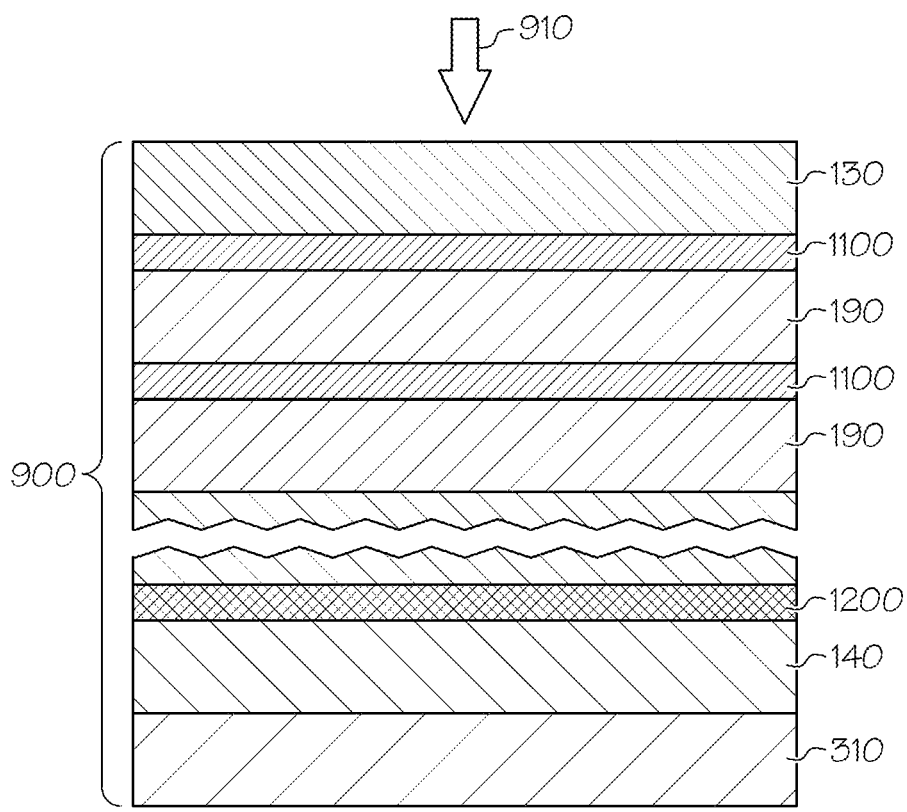
FIG. 9 schematically depicts a layered structure for adhering a lens to a lens holder including multiple anti-reflective layers and multiple absorbers according to one or more embodiments shown or described herein.

Referring now to FIG. 9, the layered structure 900 may comprise multiple light absorbers 190 and multiple adhesion promoter/anti-reflective layers 1100. The number of light absorbers 190 and adhesion promoter/anti-reflective layers 1100 is limited by the physical constraints of the optical apparatus. In embodiments each light absorber 190 has an adhesion promoter/anti-reflective layer 1100 positioned on the side nearest the lens 130. In some embodiments there may be two light absorbers 190 and two adhesion promoter/anti-reflective layers 1100, or even three light absorbers 190 and three adhesion promoter/anti-reflective layers 1100. In other embodiments there may be four light absorbers 190 and four adhesion promoter/anti-reflective layers 1100, or even five light absorbers 190 and five adhesion promoter/anti-reflective layers 1100.

Although FIGS. 7-9 show all of the components of the layered structures situated on one side of the lens, in some embodiments, the adhesive may be positioned on an opposite side of the lens from the other components of the layered structure so long as the other components of the layered structure prevent UV light from being incident to the adhesive. For example, in embodiments, the absorber (and optionally the anti-reflective/adhesion promoting layer and the protective layer) may be positioned on a side of the lens that is incident to a light source. The adhesive may be positioned on the opposite, non-incident side of the lens but the absorber may still prevent UV light from being incident to the adhesive if the adhesive is configured properly.

The layered structures may be applied to the lens by any suitable method. For example, in some embodiments, the layered structure may be applied by vacuum deposition, sputtering, spray coating, ink-jet printing, etc. In embodiments where the layered structures are applied by, for example, vacuum deposition or sputtering, a mask may be used to protect the optical surface of the lens during the application. The mask is configured to directly contact only the circumference of the lens and does not directly contact the optical surface of the lens so as to not scratch or otherwise damage the optical surface of the lens while providing protection from the deposition methods. The mask does not cover predetermined portions of the lens that are intended to be adhered to the lens holder. Once the mask is in place, the layered structure may be applied to the predetermined portions of the lens.

Also disclosed are methods for protecting an adhesive in an optical apparatus. In embodiments, the method comprises applying at least a light absorber as described herein to a lens. The light absorber is configured so that when the lens is installed in an optical apparatus, the light absorber is positioned to shield the adhesive so that UV light is not incident to the adhesive. The light absorber does not transmit UV light from a light source, which may degrade the adhesive. Embodiments of the method may further include applying an adhesion promoter/anti-reflective layer as described herein to the lens positioned between the lens and the absorber. Some embodiments of the method may include applying a protective layer as described herein to a surface of the absorber opposite the lens to protect the lens during handling, such as during installation into the optical apparatus. Each layer of the layered structure may be applied by any suitable deposition method, such as vacuum deposition, spin-on coating, sol-gel deposition, inkjet deposition, chemical vapor deposition, physical vapor deposition, and electron beam evaporation. In some embodiments, each layer of the layered structure may be applied by the same deposition method. However, in other embodiments, one or more layers of the layered structure may be applied by a different deposition method than other layer(s). Some embodiments comprise contacting one of the light absorber or the protective layer with an adhesive that is configured to adhere the lens to a lens holder.

EXAMPLES

Embodiments will be further clarified by the following examples.

Example 1

Figure 10:
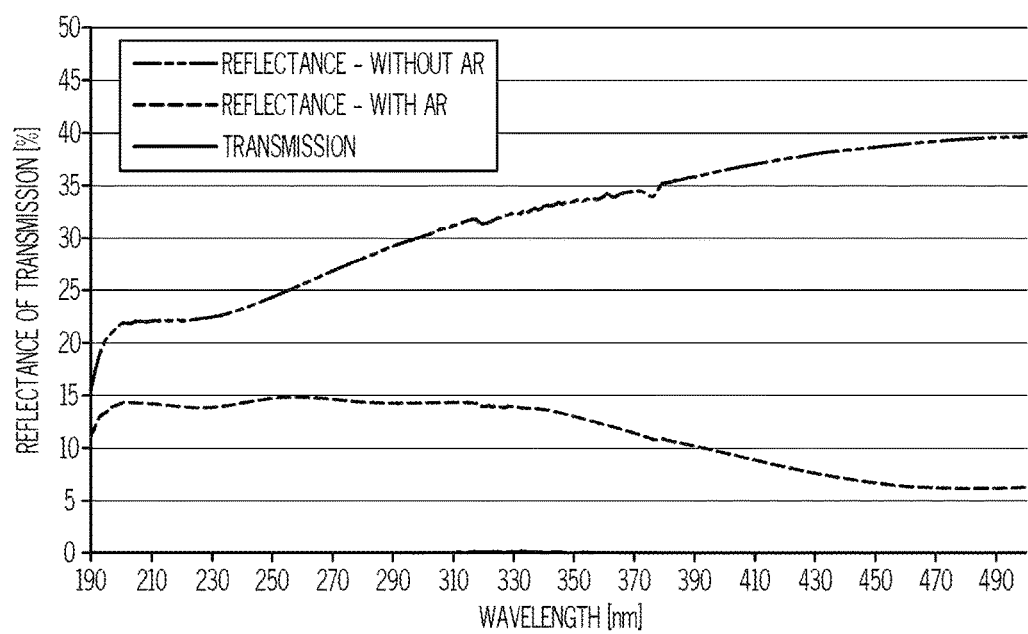
FIG. 10 is a graph showing the transmission and reflectance of lens assemblies according to embodiments.

An optical assembly was constructed with a lens adhered to a lens holder by a layered structure comprising a 30-60 nm thick $Cr_2O_3$ adhesion promoter/anti-reflective layer positioned on one surface of the lens, a 100-300 nm thick Cr light absorber layer positioned on the adhesion promoter/anti-reflective layer, a 100-200 nm $Cr_2O_3$ protective layer positioned on the light absorber, and an adhesive between the protective layer and a lens holder that holds the layered structure and the lens to the lens holder. Each of the above layers was applied using an electron beam evaporation method. The layered structure was irradiated with light, and the transmission and reflectance of UV light having wavelengths of from 250 nm to 400 nm was measured. As shown in FIG. 10, the transmission of UV light having wavelengths of from 250 nm to 400 nm through the layered structure was 0% (lying along the x-axis). The reflectance of UV light (Reflectance—with AR) having wavelengths of from 190 nm to 500 nm through the layered structure was less than 15%.

Example 2

An example was prepared in the same manner as Example 1, except that the layered structure did not include the $Cr_2O_3$ adhesion promoter/anti-reflective layer and the protective layer was 60-100 nm thick. Each layer in this example was applied using an electron beam evaporation method. The layered structure was irradiated with light, and the transmission and reflectance of UV light having wavelengths of from 250 nm to 400 nm was measured. As shown in FIG. 10, the transmission of UV light having wavelengths of from 250 nm to 400 nm through the layered structure was 0% (lying along the x-axis). The reflectance of UV light (Reflectance—without AR) having wavelengths of from 190 nm to 500 nm through the layered structure was between 15% and 40%.

It should now be understood that lens assemblies and optical systems that include lens assemblies according to the present disclosure include a lens holder and a lens. The lens is coupled to the lens holder with an adhesive that is interrupted at positions proximate to the circumference of the lens. Light in the optical system is provided in an optical footprint that has a plurality of high-intensity regions that are separated from a plurality of low-intensity regions evaluated along the circumference of the lens. The lens assembly is positioned in the optical system so that the adhesive is spaced apart from the high-intensity regions of the optical footprint.

It is noted that the term "substantially" may be utilized herein to represent the inherent degree of uncertainty that may be attributed to any quantitative comparison, value, measurement, or other representation. This term is also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A lens assembly comprising:
   a lens;
   a light absorber that does not transmit light with wavelengths from greater than or equal to about 190 nm to less than or equal to about 500 nm, wherein the light absorber comprises one or more members selected from the group consisting of chromium, zinc, nickel, manganese, iron, silver, gold, nitrides thereof, and carbides thereof;
   a lens holder;
   an adhesive configured to adhere the lens to the lens holder,
   wherein the light absorber is positioned such that light having a wavelength from greater than or equal to about 190 nm to less than or equal to about 500 nm is not incident to the adhesive;
   an adhesion promoter layer, wherein the adhesion promoter layer comprises a member selected from the group consisting of metal oxides, metal carbides, metal nitrides, and mixtures thereof;
   an anti-reflective layer, wherein the anti-reflective layer comprises a member selected from the group consisting of metal oxides, metal carbides, metal nitrides, and mixtures thereof; and
   a protective layer, wherein the protective layer comprises a member selected from the group consisting of metal oxides, metal carbides, metal nitrides, and mixtures thereof;
   wherein the protective layer is between the light absorber and the adhesive, and the adhesion promoter layer and anti-reflective layer are positioned between the lens and the light absorber.

2. The lens assembly of claim 1, wherein the adhesion promoter layer, the anti-reflective layer, or both, have a reflectance of less than or equal to about 20% for light with wavelengths of from greater than or equal to about 190 nm to less than or equal to about 500 nm.

3. The lens assembly of claim 1, wherein the lens assembly comprises:
   a second adhesion promoter layer, a second anti-reflective layer, or both, positioned on a surface of the light absorber opposite the lens; and
   a second light absorber positioned on the second adhesion promoter layer, the second anti-reflective layer, or both, on a side opposite the light absorber.

4. The lens assembly of claim 1, wherein the adhesive and the light absorber are arranged in an interrupted configuration at positions proximate to a circumference of the lens.

5. A lens assembly comprising,
   a lens;
   a light absorber that does not transmit light with wavelengths from greater than or equal to about 190 nm to less than or equal to about 500 nm, wherein the light absorber comprises one or more members selected from the group consisting of chromium, zinc, nickel, manganese, iron, silver, gold, nitrides thereof, and carbides thereof;
   a protective layer positioned on the light absorber, wherein the protective layer comprises a member selected from the group consisting of metal oxides, metal carbides, metal nitrides, and mixtures thereof;
   an adhesion promoter layer, wherein the adhesion promoter layer comprises a member selected from the group consisting of metal oxides, metal carbides, metal nitrides, and mixtures thereof;
   an anti-reflective layer, wherein the anti-reflective layer comprises a member selected from the group consisting of metal oxides, metal carbides, metal nitrides, and mixtures thereof;
   wherein the protective layer is between the light absorber and the adhesive, and the adhesion promoter layer and anti-reflective layer are positioned between the lens and the light absorber;
   a lens support; and
   at least one support pad positioned on the lens support.

6. The lens assembly of claim 5, wherein the adhesion promoter layer, the anti-reflective layer and the light absorber have a reflectance of less than or equal to about 20%.

7. The lens assembly of claim 5, wherein the light absorber and the protective layer are arranged in an interrupted configuration at positions proximate to a circumference of the lens.

8. A method for reducing degradation of an adhesive in a lens assembly, the method comprising:
applying a light absorber to a lens, wherein the light absorber does not transmit light with wavelengths from greater than or equal to about 190 nm to less than or equal to about 500 nm, wherein the light absorber comprises one or more members selected from the group consisting of chromium, zinc, nickel, manganese, iron, silver, gold, nitrides thereof, and carbides thereof;
applying an adhesion promoter layer to the lens, wherein the adhesion promoter layer comprises a member selected from the group consisting of metal oxides, metal carbides, metal nitrides, and mixtures thereof;
applying an anti-reflective layer to the lens, wherein the anti-reflective layer comprises a member selected from the group consisting of metal oxides, metal carbides, metal nitrides, and mixtures thereof;
applying a protective layer to the lens, wherein the protective layer comprises a member selected from the group consisting of metal oxides, metal carbides, metal nitrides, and mixtures thereof;
wherein the protective layer is between the light absorber and the adhesive, and the adhesion promoter layer and anti-reflective layer are positioned between the lens and the light absorber; and
configuring the light absorber and the adhesive so that light with wavelengths from greater than or equal to about 190 nm to less than or equal to about 500 nm is not incident to the adhesive.

9. The lens assembly of claim 1, wherein the adhesive is a cured composition having a curing wavelength and the light absorber absorbs the curing wavelength.

10. The lens assembly of claim 5, further comprising an adhesive positioned between the lens holder and the light absorber, wherein the adhesive is a cured composition having a curing wavelength and the light absorber absorbs the curing wavelength.

11. The lens assembly of claim 1, wherein when the adhesion promoter layer, the anti-reflective layer, or the protective layer comprises a metal oxide, the metal oxide is chromium oxide.

12. The lens assembly of claim 5, wherein when the adhesion promoter layer, the anti-reflective layer, or the protective layer comprises a metal oxide, the metal oxide is chromium oxide.

13. The method of claim 8, wherein when the adhesion promoter layer, the anti-reflective layer, or the protective layer comprises a metal oxide, the metal oxide is chromium oxide.

14. The lens assembly of claim 1, wherein:
the light absorber is chromium;
the adhesion promoter layer is chromium oxide;
the anti-reflective layer is chromium oxide; and
the protective layer is chromium oxide.

15. The lens assembly of claim 5, wherein:
the light absorber is chromium;
the adhesion promoter layer is chromium oxide;
the anti-reflective layer is chromium oxide; and
the protective layer is chromium oxide.

16. The method of claim 8, wherein:
the light absorber is chromium;
the adhesion promoter layer is chromium oxide;
the anti-reflective layer is chromium oxide; and
the protective layer is chromium oxide.

* * * * *